US009676317B1

(12) United States Patent
Holz et al.

(10) Patent No.: US 9,676,317 B1
(45) Date of Patent: Jun. 13, 2017

(54) SYSTEM AND METHOD FOR REMOTELY-OPERATED DEPLOYMENT AND RETRIEVAL OF COMMUNICATION RELAYS

(71) Applicant: The United States of America as represented by the Secretary of the Navy, Washington, DC (US)

(72) Inventors: Kevin Holz, San Diego, CA (US); Aaron Burmeister, San Diego, CA (US); Abraham Hart, San Diego, CA (US); Narek Pezeshkian, Glendale, CA (US); Hoa G. Nguyen, San Diego, CA (US)

(73) Assignee: The United States of America as represented by Secretary of the Navy, Washington, DC (US)

( * ) Notice: Subject to any disclaimer, the term of this patent is extended or adjusted under 35 U.S.C. 154(b) by 16 days.

(21) Appl. No.: 14/746,712

(22) Filed: Jun. 22, 2015

Related U.S. Application Data

(62) Division of application No. 13/470,850, filed on May 14, 2012, now Pat. No. 9,094,082.

(51) Int. Cl.
  *B60P 1/54* (2006.01)
  *B25J 5/00* (2006.01)
(52) U.S. Cl.
  CPC .. *B60P 1/54* (2013.01); *B25J 5/00* (2013.01)
(58) Field of Classification Search
  CPC ...... B60P 1/04; B60P 1/14; B60P 1/16; B60P 1/48; B60P 1/483; B60P 1/5461; B60P 1/54; B25J 5/005; B25J 5/00; B25J 11/002; B25J 13/006; B25J 18/007; B25J 15/0052; H04B 3/60; H04B 7/165; H04B 7/14; H04B 7/155; H04W 16/20; H04W 88/04; H01Q 1/125
  See application file for complete search history.

(56) References Cited

U.S. PATENT DOCUMENTS

| 3,241,687 | A | * | 3/1966 | Orloff et al. | B25J 5/00 212/278 |
| 3,771,666 | A | * | 11/1973 | Fournier | B66C 1/30 212/318 |
| 5,042,959 | A | * | 8/1991 | Tadatsu | B63C 11/52 405/188 |

(Continued)

*Primary Examiner* — Glenn Myers
(74) *Attorney, Agent, or Firm* — SPAWAR Systems Center Pacific; Kyle Eppele; Elliott Deaderick

(57) ABSTRACT

A system includes a remotely-operated ground vehicle having first and second lift members, a first lift mechanism coupled to the first lift member, and a second lift mechanism coupled to the second lift member, where the first and second lift mechanisms are positioned at different angles with respect to a ground surface. The first and second lift members may be positioned at opposite sides of a front end of the vehicle and may be controlled by a single motor. The lift mechanisms may have a body portion including first and second prongs separated by an opening, with a plurality of magnets embedded within the body portion near the intersection of the first and second prongs. A communication relay may be secured to each lift mechanism via the opening and a magnetic coupling between the magnets embedded within the body portion and magnets embedded within the communication relay.

11 Claims, 10 Drawing Sheets

(56) References Cited

U.S. PATENT DOCUMENTS

| | | | | |
|---|---|---|---|---|
| 6,460,414 | B1* | 10/2002 | Erickson | G01N 29/223 |
| | | | | 34/89 |
| 6,981,932 | B1* | 1/2006 | Huang | A63B 21/00072 |
| | | | | 482/121 |
| 7,415,321 | B2* | 8/2008 | Okazaki | B25J 9/1697 |
| | | | | 318/568.1 |
| 8,892,258 | B2* | 11/2014 | Jacobsen | B25J 5/007 |
| | | | | 483/27 |
| 2011/0171000 | A1* | 7/2011 | Hailston | B62B 3/06 |
| | | | | 414/607 |
| 2012/0118195 | A1* | 5/2012 | Creighton | B61D 7/00 |
| | | | | 105/377.06 |
| 2012/0328395 | A1* | 12/2012 | Jacobsen | B25J 3/04 |
| | | | | 414/1 |
| 2013/0011220 | A1* | 1/2013 | Jacobsen | B25J 3/04 |
| | | | | 414/2 |

* cited by examiner

SYSTEM AND METHOD FOR REMOTELY-OPERATED DEPLOYMENT AND RETRIEVAL OF COMMUNICATION RELAYS

CROSS-REFERENCE TO RELATED APPLICATIONS

This application is a divisional application of U.S. Non-Provisional patent application Ser. No. 13/470,850, filed May 14, 2012, entitled "System and Method for Remotely-Operated Deployment and Retrieval of Communication Relays", which claims the benefit of U.S. Provisional Patent Application Ser. No. 61/617,183, filed Mar. 29, 2012, entitled "System and Method for Remotely-Operated Deployment and Retrieval of Communication Relays," the content of which is fully incorporated by reference herein.

FEDERALLY-SPONSORED RESEARCH AND DEVELOPMENT

The System and Method for Remotely-Operated Deployment and Retrieval of Communication Relays is assigned to the United States Government and is available for licensing for commercial purposes. Licensing and technical inquiries may be directed to the Office of Research and Technical Applications, Space and Naval Warfare Systems Center, Pacific, Code 72120, San Diego, Calif., 92152; voice (619) 553-5118; email sscpac_T2@navy.mil. Reference Navy Case Number 103668.

BACKGROUND

Remotely-controlled robotic systems, such as those used to investigate and neutralize improvised explosive devices, typically communicate using high-frequency digital links and require line-of-sight (LOS) between the robotic system and the operator. In certain situations, LOS communication is not possible due to various obstacles. One method to overcome these obstacles is to use a tethered connection to the robotic system. However, communication will be lost if the tether breaks. Further, maneuverability of the robotic system may be impeded if the tether gets caught on one or more obstacles. Another method to provide non-LOS (NLOS) communications is to use a system, such as that described in U.S. Pat. No. 8,103,212 to Pezeshkian et al., configured to automatically deploy communication relays to keep the communication link intact. However, a disadvantage to this type of system is that the system cannot retrieve the deployed communication relays.

Accordingly, a need exists for a system and method for remotely-operated deployment and retrieval of communication relays.

DETAILED DESCRIPTION OF SOME EMBODIMENTS

Figure 1:
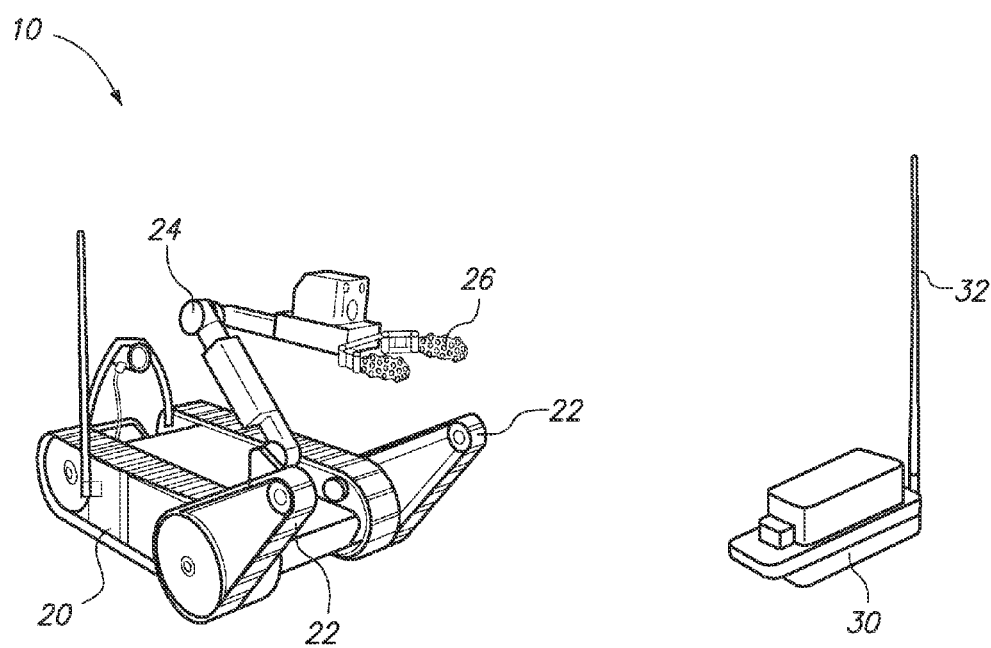
FIG. 1 shows a diagram of a remotely-operated system that may be used in accordance with the System and Method for Remotely-Operated Deployment and Retrieval of Communication Relays.

FIG. 1 shows a diagram of a remotely-operated system 10 that may be used in accordance with the System and Method for Remotely-Operated Deployment and Retrieval of Communication Relays. System 10 includes a remotely-operated robot 20 and a radio module 30. Robot 20 contains two tracks each having a flipper 22 attached thereto, an adjustable arm 24, and a gripper mechanism 26 attached to arm 24. Radio module 30 includes an antenna 32 attached thereto. While radio module 30 is shown separate from robot 20, in some embodiments, radio module 30 may be embedded within robot 20. As an example, radio module 30 may operate at a frequency range of 2.4 GHz. It should be recognized that system 10 is only one example of a robotic system that may be used, and that other robotic systems may be suitable for the methods described herein.

Figure 2:
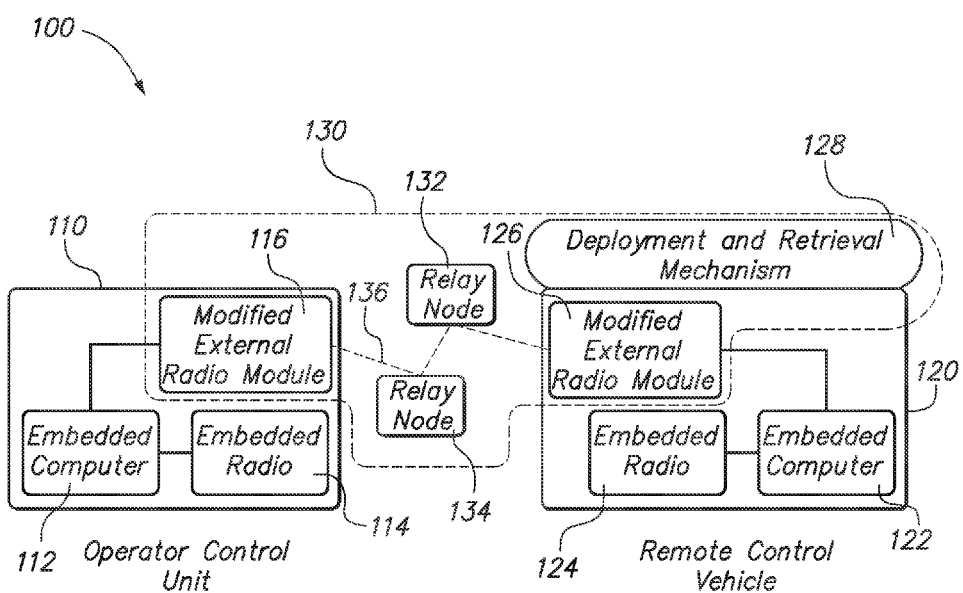
FIG. 2 shows a diagram of a communications network for the system shown in FIG. 1, including two communication relays.

FIG. 2 shows a diagram 100 a communications network for the system shown in FIG. 1, including two communication relays. As shown, the operator control unit (OCU) 110 forms a mesh network with remote control vehicle (RCV) 120, such as robot 20 of FIG. 1. OCU 110 contains an embedded computer 112, an embedded radio 114, and a modified external radio module 116. RCV 120 includes an embedded computer 122, an embedded radio 124, a modified external radio module 126, and a deployment and retrieval mechanism 128.

Figure 4:
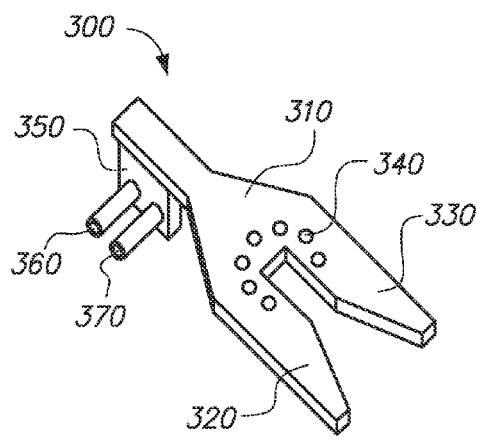
FIGS. 4-6 show diagrams of embodiments of the deployment/retrieval mechanism that may be used in accordance with the System and Method for Remotely-Operated Deployment and Retrieval of Communication Relays.
Figure 5:
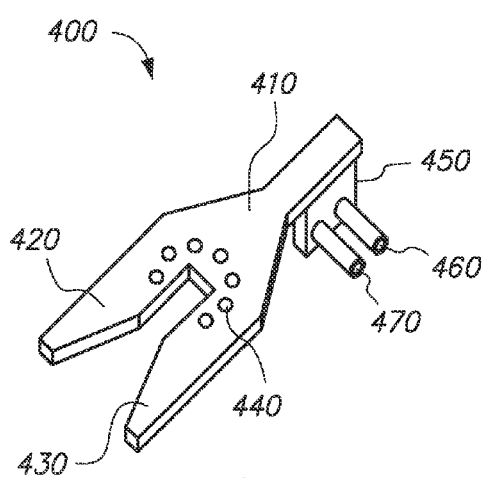
Figure 6:
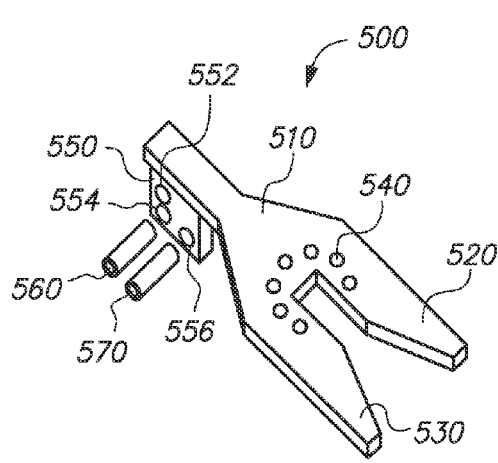

The components shown in dashed line 130 represent components that are modified or added to a robotic system, such as robotic system 10 of FIG. 1, to achieve the network capabilities. Modified external radio modules 116 and 126 may represent embedded radio modules that have had their software modified to work with communication relay nodes 132 and 134. In some embodiments, embedded radios 114 and 124 may also have their software modified to work with communication relay nodes 132 and 134. In some embodiments, such software modification may include ensuring that radio modules 114, 116, 124, and 126 operate in accordance with the Babel mesh network as described with reference to FIG. 7 herein. Deployment and retrieval mechanism 128 represents the mechanism that is added to the robotic system to allow for deployment and retrieval of communication relay nodes 132 and 134. Examples of mechanism 128 are shown in FIGS. 4-6.

Between OCU 110 and RCV 120 are two communication relay nodes 132 and 134, which have been deployed according to the methods discussed herein. OCU 110 and RCV 120 communicate via the link 136 created between modified external radio module 116, modified external radio module 126, communication relay node 132, and communication relay node 134. In embodiments where the embedded radios 114 and 124 have had their software modified to work with communication relay nodes 132 and 134, OCU 110 and RCV 120 may communicate via a link between embedded radio 114, communication relay nodes 132 and 134, and embedded radio 124. The use of relay nodes 132 and 134 allows NLOS communications between OCU 110 and RCV 120 in situations such as, for example, when RCV 120 travels around a corner. By adding a communication relay at the corner, that communication relay can maintain LOS with both RCV 120 and OCU 110.

Additional communication relays can be added to the network to increase the physical network size, providing greater coverage. Additional communication relays may also provide alternate routing paths. For example, if either communication relay 132 or 134 fails for some reason and another path exists via another relay node in the network, the routing path will automatically switch and maintain link 136 between OCU 110 and RCV 120.

Figure 3:
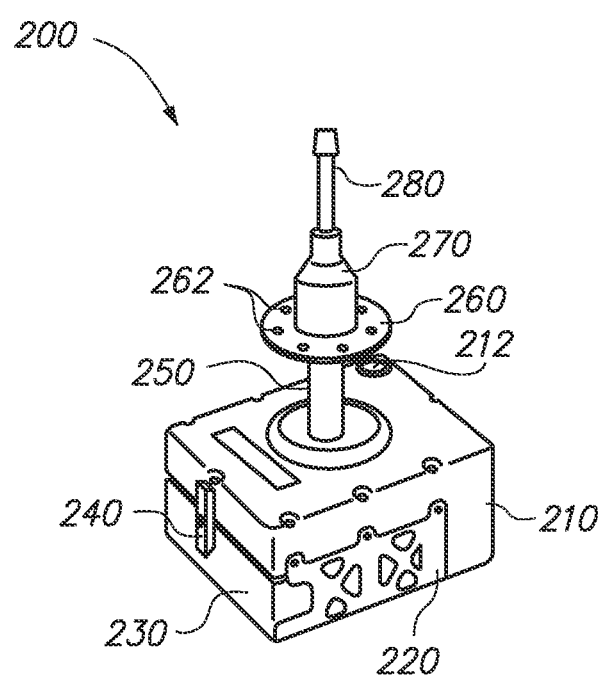
FIG. 3 shows a diagram of an embodiment of a communication relay that may be used in accordance with the System and Method for Remotely-Operated Deployment and Retrieval of Communication Relays.

FIG. 3 shows a diagram of an embodiment of a communication relay 200 that may be used in accordance with the System and Method for Remotely-Operated Deployment and Retrieval of Communication Relays. Relay 200 includes an electronics enclosure 210, a battery cage 220, a battery 230, a battery latch 240, a deployment/retrieval mechanism catch 250 including a catch disk 260, and an antenna mast 270. Antenna mast 270 is secured to the top of catch disk 260, such as by being screwed thereto, and has an antenna element 280 secured thereto. As an example, the size of relay 200 is about 2.6"×4"×5", relay 200 weighs about 1.5 lb. without battery 230 and weighs about 3 lb. with battery 230.

In one embodiment, electronics enclosure 210 contains a commercial-of-the-shelf (COTS) router board running Babel network software and a COTS radio card that operates in a suitable frequency band. Electronics enclosure 210 may also include a power button 212 located thereon to activate/inactivate relay 200. In some embodiments, power button 212 includes a built-in LED. The LED may be used to indicate network connectivity. The LED will remain illuminated so long as relay 200 is part of the mesh network; otherwise it may be off or may blink to indicate that it is looking to connect to a network. In some embodiments, relay 200 includes a dedicated power and network LED, rather than a single LED indicating network connectivity.

Electronics enclosure 210 also houses the battery connector and a power switch (not shown). An opening in electronics enclosure 210 allows the user to read the battery capacity meter that is on battery 230. As an example, battery 230 may be the standard military issue battery, model BB2557. Battery cage 220 supports battery 230 and allows a user to insert and remove battery 230. Battery latch 240 keeps battery 230 in place during use of relay 200. Once battery 230 has been inserted, the user must rotate battery latch 240 ninety degrees to prevent battery 230 from sliding out. In some embodiments, electronics enclosure 210 may use two battery latches 240 for a more secured confinement. In some embodiments, as battery latch 240 is being rotated into a locked position (i.e. the battery is locked into place), battery latch 240 pushes an o-ring of the battery's connector onto the bulkhead of the mating connector. Such an action seals the leads of the battery connection and provides a water tight connection.

Deployment/retrieval mechanism catch 250 is secured to the top of electronics enclosure 210. The deployment/retrieval mechanism (shown in FIGS. 4-6) lifts relay 200 via catch 250, which includes catch disk 260. As an example, catch disk 260 is located about 2 inches above the top of electronics enclosure 210. In some embodiments, catch disk 260 includes a plurality of magnets 262 embedded therein around the disk. As shown in FIGS. 4-6, the deployment/retrieval mechanism also includes magnets, allowing relay 200 to remain secured to the robotic system when the robotic system transports relay 200.

FIGS. 4-6 show diagrams of embodiments of the deployment/retrieval mechanism that may be used in accordance with the System and Method for Remotely-Operated Deployment and Retrieval of Communication Relays. The mechanisms shown in FIGS. 4-6 are designed to attach to a robotic system via the flippers, such as flippers 22 shown in FIG. 1. In some embodiments, the mechanisms are attached to the inside of flippers 22 to allow the robotic system to fit into narrower spaces. However, the mechanisms may also be secured to the outside of flippers 22 if the overall width of the robotic system is not a concern. As an example, mechanisms 300, 400, and 500, in addition to mechanism catch disk 260, may be made out of hard plastic, sheet metal, or other hard material that is non-ferrous to prevent weakening of the magnetic attraction forces between the two components.

The deployment/retrieval mechanisms are needed in a robotic system such as system 10 shown in FIG. 1 because, while it is possible to carry communication relays in the RCV gripper mechanism, such as gripper mechanism 26 shown in FIG. 1, there are two major disadvantage to this approach: 1) to place and retrieve communication relays using the gripper mechanism requires complex control of the manipulator by the operator, which is a difficult task and time consuming; and 2) if the gripper mechanism is used, for example, to carry an item such as an explosive charge to the possible IED location, the robotic system cannot carry the charge and the communication relays at the same time.

The mechanisms shown in FIGS. 4-6 are designed to be attached to the front of a robotic system. However, in some embodiments, such as those that may utilize a robotic system configured differently than is shown in FIG. 1, the deployment/retrieval mechanisms can be mounted on the rear of the robotic system and a mechanical link between the rear mechanism and the flippers can be used to pick-up and place communication relays using the flipper action. Alternatively, the manipulator arm can be used to actuate a release mechanism mounted on the rear of the robot. Additionally, a motorized release mechanism may be designed to allow for the operator to provide the release signal transmitted from the OCU. This will require additional software on the OCU-side.

FIG. 4 shows a mechanism 300 suited for attachment to the inside of the right flipper of a robotic system. Mechanism 300 includes a body portion 310 shaped as a fork having a first prong 320 and a second prong 330, with each prong being tapered near the ends. The opening between first prong 320 and second prong 330 is shaped to accommodate the elongated portion of deployment/retrieval mechanism catch 250 shown in FIG. 3. The portion of body 310 near the intersections of first prong 320 and second prong 330 includes a plurality of magnets 340 embedded therein. Magnets 340, along with the magnets 262 embedded within catch disk 260, provide a secure magnetic coupling between mechanism 300 and relay 200. Such magnetic coupling helps prevent relay 200 from disengaging from mechanism 300 if the robotic system traverses rough terrain, for example.

Figure 7:
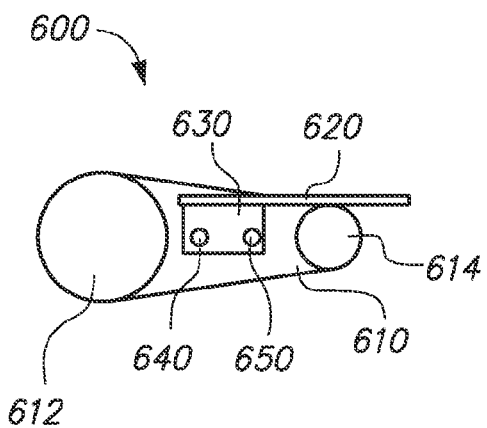
FIGS. 7-9 show diagrams illustrating the angular positioning of the deployment/retrieval mechanisms shown in FIGS. 4-6, respectively, when attached to a remotely-operated ground vehicle, in accordance with the System and Method for Remotely-Operated Deployment and Retrieval of Communication Relays.

Mechanism 300 also includes a flipper attachment portion 350, with flipper attachments 360 and 370. Flipper attachments 360 and 370 are designed to secure mechanism 300 to the flippers of the robotic system. As an example, flipper attachments 360 and 370 may each be glued into a hole drilled into the flipper, may be welded in place, or may be designed to receive a screw that is used to secure mechanism 300 to the flipper. As shown, flipper attachment 360 and 370 are secured to flipper attachment portion 350 in-line, as opposed to being offset from one another. Such a configuration allows mechanism 300 to lie in a plane parallel to its respective flipper, as shown in FIG. 7.

Figure 8:
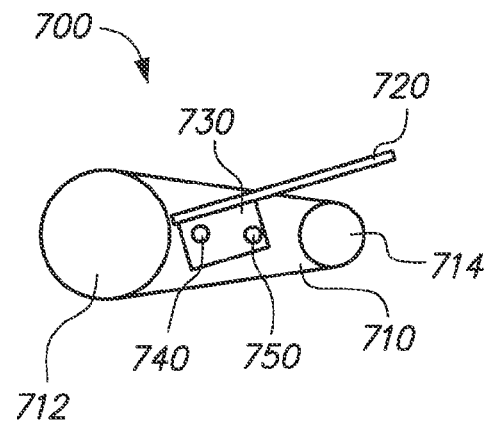

Referring to FIG. 5, mechanism 400 is configured similarly as mechanism 300, except that mechanism 400 is configured to lie in a different plane at a different angle than its respective flipper, as shown in FIG. 8. Mechanism 400 is suited for attachment to the inside of the left flipper of a robotic system. Mechanism 400 includes a body portion 410 shaped as a fork having a first prong 420 and a second prong 430, with each prong being tapered near the ends. The opening between first prong 420 and second prong 430 is shaped to accommodate the elongated portion of deployment/retrieval mechanism catch 250 shown in FIG. 3. The portion of body 410 near the intersections of first prong 420 and second prong 430 includes a plurality of magnets 440 embedded therein. Magnets 440, along with the magnets 262 embedded within catch disk 260, provide a secure magnetic coupling between mechanism 400 and relay 200.

Mechanism 400 also includes a flipper attachment portion 450, with flipper attachments 460 and 470. As shown, flipper attachment 460 and 470 are secured to flipper attachment portion 450 offset from one another. Such a configuration allows mechanism 400 to lie in a plane at a different angle than its respective flipper. Offset mechanisms, coupled with unison rotation of the flippers, helps enable the manual remote deployment and retrieval of communication relays in accordance with the methods discussed in more detail with respect to FIG. 17 herein.

Figure 9:
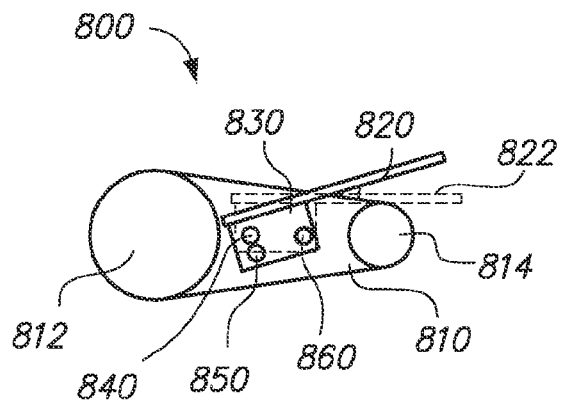

Referring to FIG. 6, mechanism 500 is configured similarly as mechanisms 300 and 400, except that mechanism 500 is configured to be adjustable to lie in a plane parallel to its respective flipper or in a different plane at a different angle than its respective flipper, as shown in FIG. 9. Mechanism 500 includes a body portion 510 shaped as a fork having a first prong 520 and a second prong 530, with each prong being tapered near the ends. The opening between first prong 520 and second prong 530 is shaped to accommodate the elongated portion of deployment/retrieval mechanism catch 250 shown in FIG. 3. The portion of body 510 near the intersections of first prong 520 and second prong 530 includes a plurality of magnets 540 embedded therein. Magnets 540, along with the magnets 262 embedded within catch disk 260, provide a secure magnetic coupling between mechanism 500 and relay 200.

Mechanism 500 also includes a flipper attachment portion 550, with flipper attachments 560 and 570. As shown, flipper attachment 560 may be positioned within either of holes 552 or 554 of flipper attachment portion 550, and flipper attachment 570 may be positioned within hole 556 of flipper attachment portion 550, to allow mechanism 500 to lie in a plane parallel to its respective flipper or in a different plane at a different angle than its respective flipper, as shown in FIG. 9. Mechanism 500 is suited for attachment to the inside of either the right or the left flipper of the robotic system.

FIGS. 7-9 show diagrams illustrating the positioning of the deployment/retrieval mechanisms shown in FIGS. 4-6, respectively, when attached to a remotely-operated ground vehicle, in accordance with the System and Method for Remotely-Operated Deployment and Retrieval of Communication Relays.

FIG. 7 shows a diagram 600 of a flipper 610, with a back end 612 and a front end 614, having a deployment/retrieval mechanism, with a body 620 and flipper attachment portion 630, attached thereto. As an example, the mechanism secured to flipper 610 is configured similarly as mechanism 300 shown in FIG. 4. The mechanism is attached to flipper 610 such that the first and second prongs, such as prongs 320 and 330, are directed towards front end 614. The mechanism is secured to flipper 610 via flipper attachment portions 640 and 650.

FIG. 8 shows a diagram 700 of a flipper 710, with a back end 712 and a front end 714, having a deployment/retrieval mechanism, with a body 720 and flipper attachment portion 730, attached thereto. As an example, the mechanism secured to flipper 710 is configured similarly as mechanism 400 shown in FIG. 5. The mechanism is attached to flipper 710 such that the first and second prongs, such as prongs 420 and 430, are directed towards front end 714. The mechanism is secured to flipper 710 via flipper attachment portions 740 and 750.

FIG. 9 shows a diagram 800 of a flipper 810, with a back end 812 and a front end 814, having a deployment/retrieval mechanism, with a body 820 and flipper attachment portion 830, attached thereto. As an example, the mechanism secured to flipper 810 is configured similarly as mechanism 500 shown in FIG. 6. The mechanism is attached to flipper 810 such that the first and second prongs, such as prongs 520 and 530, are directed towards front end 814. The mechanism is secured to flipper 810 via flipper attachment portions 840 or 850, and 860. If the mechanism is secured via flipper attachment portion 840, the mechanism body 820 will lie in an angled plane with respect to flipper 810. If the mechanism is secured via flipper attachment portion 850, the mechanism body 820 will lie in the same plane with respect to flipper 810, as shown by dashed line 822.

The angle by which mechanism body 820 is offset from flipper 810 may be varied depending upon system design. For example, the flipper attachment portion 830 may be configured to include several holes at varying locations, or some other adjustment means, to allow a user to offset the mechanism body 820 from the flipper 810 at either 10, 20, or 30 degrees.

Figure 10:
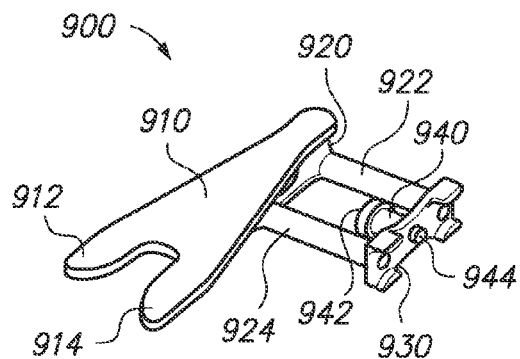
FIGS. 10-12 show diagrams illustrating an embodiment of a quick-release mechanism for securing a deployment/retrieval mechanism to a flipper of a robotic system, in accordance with the System and Method for Remotely-Operated Deployment and Retrieval of Communication Relays.
Figure 11:
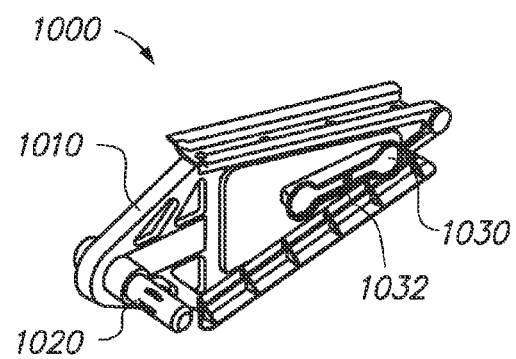
Figure 12:
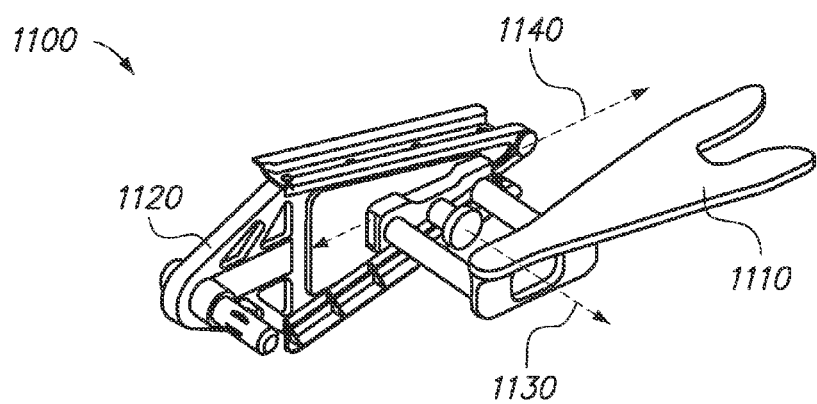

FIGS. 10-12 show diagrams illustrating an embodiment of a quick-release mechanism for securing a deployment/retrieval mechanism to a flipper of a robotic system, in accordance with the System and Method for Remotely-Operated Deployment and Retrieval of Communication Relays. The quick-release mechanism allows a user to attach or remove the deployment/retrieval mechanism without the use of tools and in a timely manner.

Referring to FIG. 10, FIG. 10 shows an embodiment of a deployment/retrieval mechanism 900 including a body portion 910 shaped as a fork having a first prong 912 and a second prong 914, with each prong being tapered near the ends. The opening between first prong 912 and second prong 914 is shaped to accommodate the elongated portion of deployment/retrieval mechanism catch 250 shown in FIG. 3. The portion of body 910 near the intersections of first prong 912 and second prong 914 includes a plurality of magnets, such as shown in FIGS. 4-6, embedded therein. The magnets, along with the magnets 262 embedded within catch disk 260, provide a secure magnetic coupling between mechanism 900 and relay 200. Such magnetic coupling helps prevent relay 200 from disengaging from mechanism 900 if the robotic system traverses rough terrain, for example.

Mechanism 900 also includes a spacer attachment portion 920, with spacer attachments 922 and 924 coupled thereto. Spacer attachments 922 and 924 may be the same as flipper attachments 360, 370, 460, 470, 560, or 570 as shown in FIGS. 4-6. Spacer attachments 922 and 924 are coupled to a mechanism adapter 930 that is designed to secure mechanism 900 to a flipper, such as flipper 1000 shown in FIG. 11, of the robotic system. As shown, spacer attachments 922 and 924 are secured to spacer attachment portion 920 in-line, as opposed to being offset from one another. Such a configuration allows mechanism 900 to lie in a plane parallel to its flipper, as shown in FIG. 12. However, in other embodiments, spacer attachments may be offset as shown in FIGS. 4 and 5. Mechanism 900 further includes a release mechanism 940 secured thereto. Release mechanism 940 includes a knob 942 and a pin 944 that is disposed through mechanism adapter 930.

FIG. 11 shows a perspective view of a flipper 1000 that is configured to combine with mechanism 900 to produce the mechanism/flipper system 1100 as shown in FIG. 12. Flipper 1000 includes a body portion 1010 that is connected to a robotic system via an attachment pin 1020. Flipper 1000 further includes a flipper adapter 1030 having a pin groove 1032 therein. Flipper adapter 1030 is fixed to body portion 1010 and is configured to couple to mechanism adapter 930 to secure mechanism 900 to flipper 1000. Such coupling occurs when a user pulls back on knob 942, which is spring loaded, and slides mechanism adapter 930 onto flipper adapter 1030 until pin 944 is aligned with pin groove 1032. Once this occurs, the user can release knob 942 to allow pin 944 to be inserted into pin groove 1032 and secure mechanism 900 to flipper 1000.

In some embodiments, as shown, mechanism adapter 930 and flipper adapter 1030 contain grooves on each of the plane-on-plane sliding surfaces to decrease the amount of friction between the two surfaces and to allow the quick-release functionality even when the components are covered with contaminants.

As shown in FIG. 12, system 1100 is the result of a mechanism 1110, such as mechanism 900, being secured to flipper 1120, such as flipper 1000. To release mechanism 1110 from flipper 1120, a user pulls back, as indicated by arrow 1130, on the knob to disengage the pin from the pin groove. Then, while the knob is pulled back, mechanism 1110 is slid linearly in either of the directions shown by arrow 1140 until the mechanism adapter is no longer in contact with the flipper adapter.

Figure 13A:
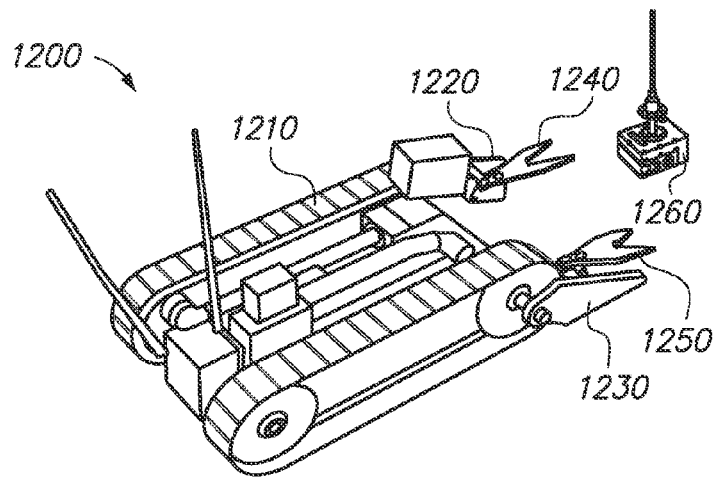
FIGS. 13A-13C show diagrams illustrating the securing of two communication relays to a remotely-operated system, in accordance with the System and Method for Remotely-Operated Deployment and Retrieval of Communication Relays.
Figure 13B:
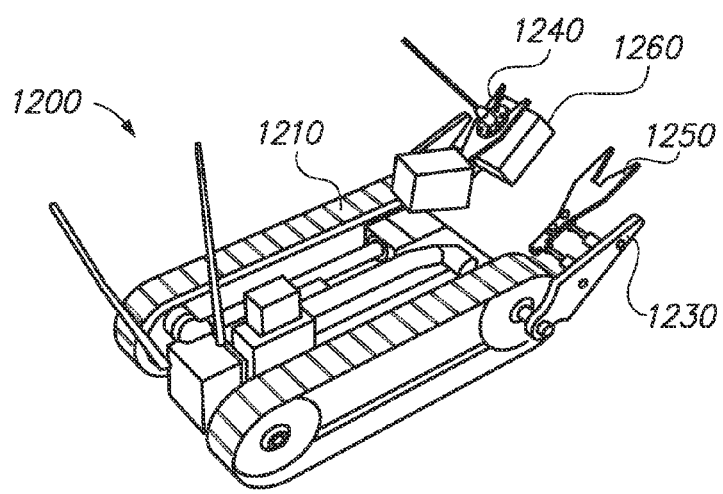
Figure 13C:
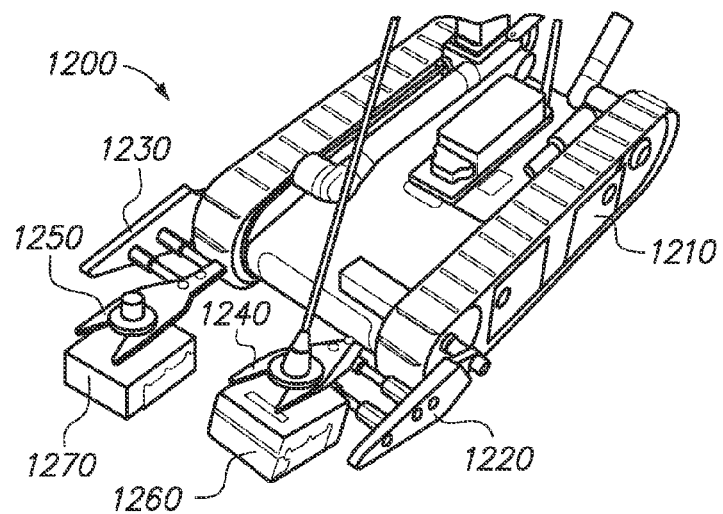

FIGS. 13A-13C show diagrams 1200 illustrating the securing of two communication relays to a remotely-operated system, in accordance with the System and Method for Remotely-Operated Deployment and Retrieval of Communication Relays. As shown, a robotic system 1210 includes a left flipper 1220, a right flipper 1230, a left deployment/retrieval mechanism 1240, and a right deployment/retrieval mechanism 1250. System 1210 is configured to engage two communication relays 1260 and 1270. Mechanism 1240 is initially positioned at a higher angle with respect to the ground than is mechanism 1250. This will help ensure that both communication relays 1260 and 1270 can be lifted and secured to system 1210. As an example, mechanism 1240 may be configured similarly to mechanism 400 shown in FIG. 5, while mechanism 1250 is configured similarly to mechanism 300 shown in FIG. 4.

As shown in FIG. 13A, system 1210 is positioned such that mechanism 1240 is located adjacent to communication relay 1260. As shown in FIG. 13B, the operator of system 1210 has engaged communication relay 1260 using mechanism 1240. Such engagement occurs by the operator moving system 1210 forward and rotating the flippers such that flipper 1240 is at a height where the elongated portion of the mechanism catch, which is below the disk catch, can engage with the mechanism in the space between the mechanism prongs. When this occurs, the operator can rotate the flippers upward, causing the body portion of the mechanism to contact the disk catch and be secured thereto using the magnetic attraction between the magnets embedded in both the mechanism and the disk catch. The operator may then continue to rotate the flippers upward to elevate communication relay 1240 off of the ground, as shown in FIG. 13B. The wide opening at the ends of the prongs of the mechanism allows the operator to line up the mechanism with the mechanism catch without pinpoint accuracy.

Next, the operator can move system 1210 to a second location where communication relay 1270 is located. The operator can perform a similar operation as described above with respect to lifting communication relay 1260, to lift communication relay 1270 off of the ground, using flipper 1230 and mechanism 1250 rather than flipper 1220 and mechanism 1240. FIG. 13C shows a diagram where both communication relays 1260 and 1270 are secured to system 1210 and are positioned above the ground surface, with communication relay 1260, which was loaded first, being at a higher angle with respect to the ground than communication relay 1270, which was loaded last, even though flippers 1220 and 1230 are positioned at the same angle with respect to the ground.

Deployment of the relays occurs in reverse order as the loading of relays. Accordingly, communication relay 1270 will be the first relay deployed, while communication relay 1260 will be the last relay deployed. Because the loaded communication relay is secured in place with magnets, deploying it requires the flippers to not just rotate down far enough to touch the bottom face of the communication relay to the ground, but also to continue to rotate slightly more to cause the magnets between the forklift and the mechanism catch disk to disengage. Once the magnets have been disengaged, the operator simply drives slightly backward to fully disengage the forklift from underneath the catch disk.

Figure 14:
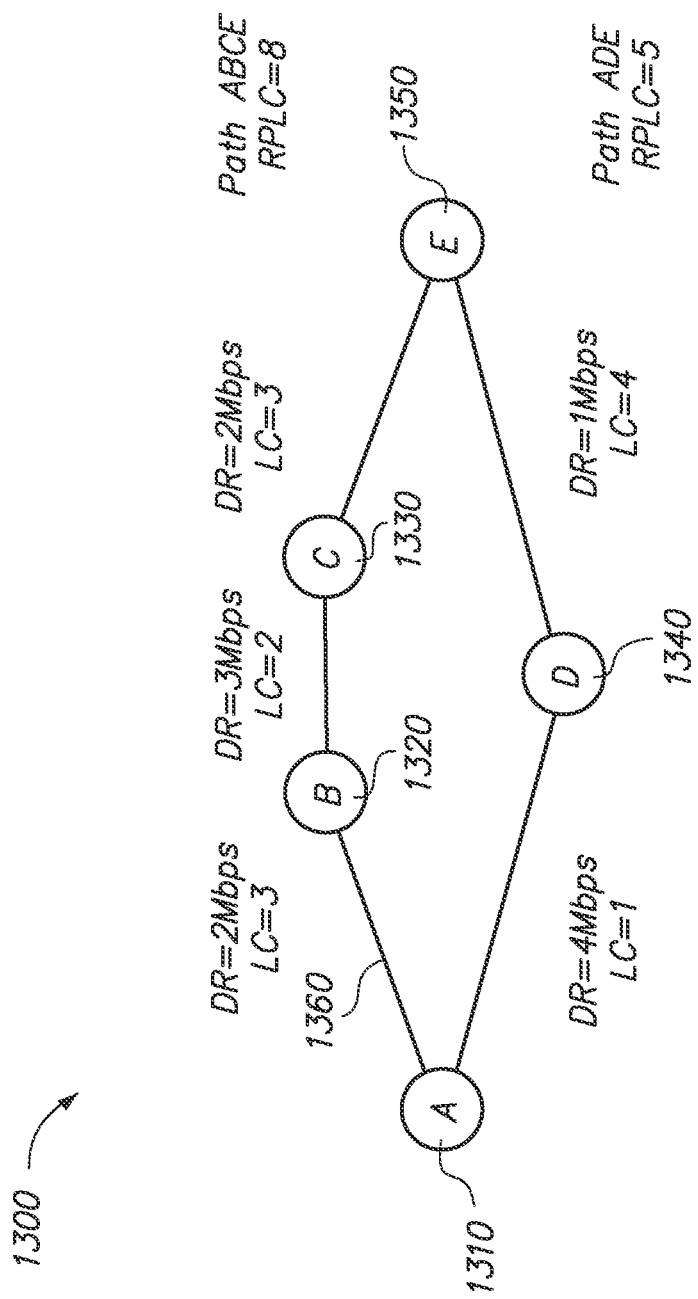
FIG. 14 shows a diagram illustrating one configuration of communication relay nodes and network links in a sample mesh network, in accordance with the System and Method for Remotely-Operated Deployment and Retrieval of Communication Relays.
Figure 17:
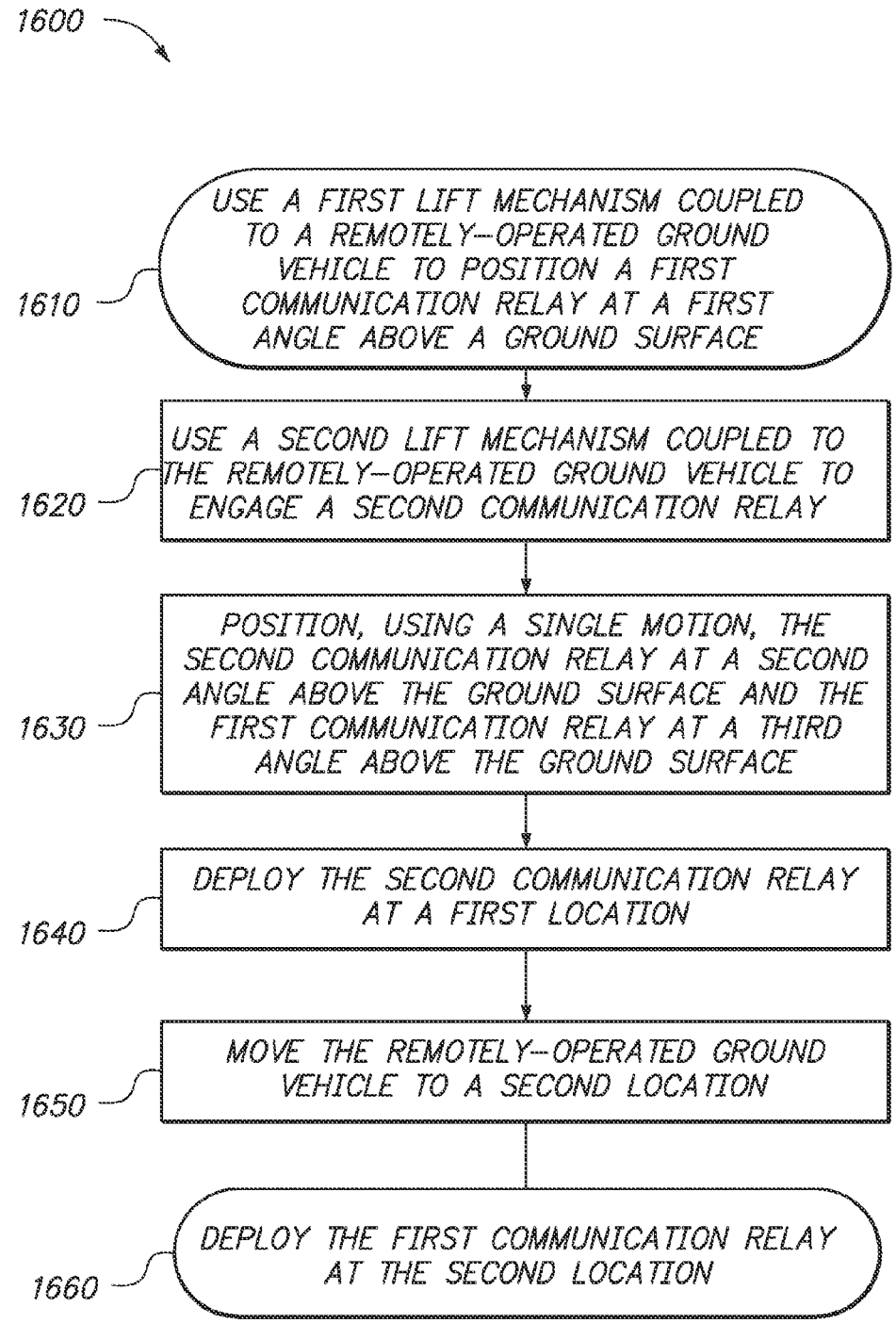
FIG. 17 shows a flowchart of an embodiment of a method in accordance with the System and Method for Remotely-Operated Deployment and Retrieval of Communication Relays.

FIG. 14 shows a diagram 1300 illustrating one configuration of communication relay nodes and network links in a sample mesh network, in accordance with the System and Method for Remotely-Operated Deployment and Retrieval of Communication Relays. An example network routing algorithm that may be used with the systems and methods described herein is an open-source algorithm called Babel. FIG. 17 illustrates a possible configuration of nodes (circles), such as nodes 1310, 1320, 1330, 1340, and 1350, and network links 1360 (dotted lines) in a sample mesh network. Suppose node A 1310 is the OCU, node E 1350 is the RCV, and nodes B 1320, C 1330, and D 1340 are the communication relays. According to the setup of FIG. 14, there are two possible routing paths to support data traffic—path ABCE and path ADE. Babel must choose either the path ABCE or ADE. The selection of a routing path is called convergence.

Figure 15:
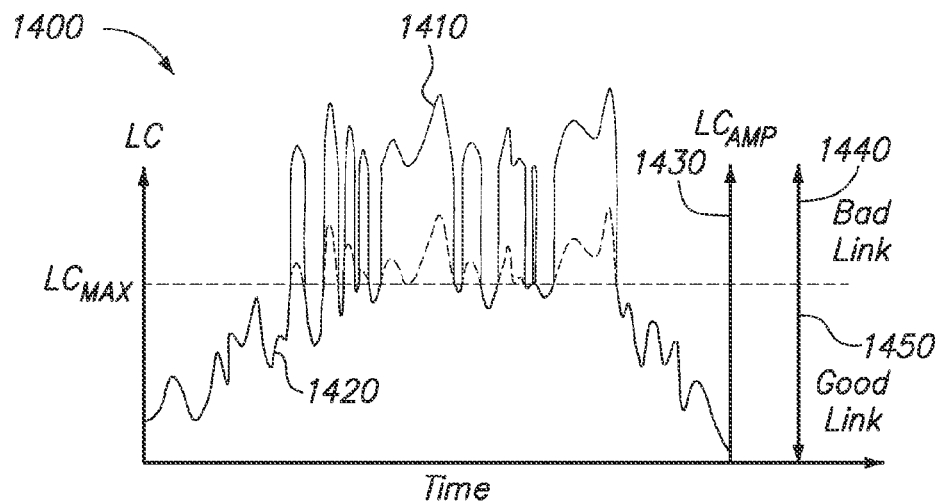
FIGS. 15 and 16 show graphs illustrating the time-varying Link Control (LC) value for a single network link with and without hysteresis, in accordance with the System and Method for Remotely-Operated Deployment and Retrieval of Communication Relays.
Figure 16:
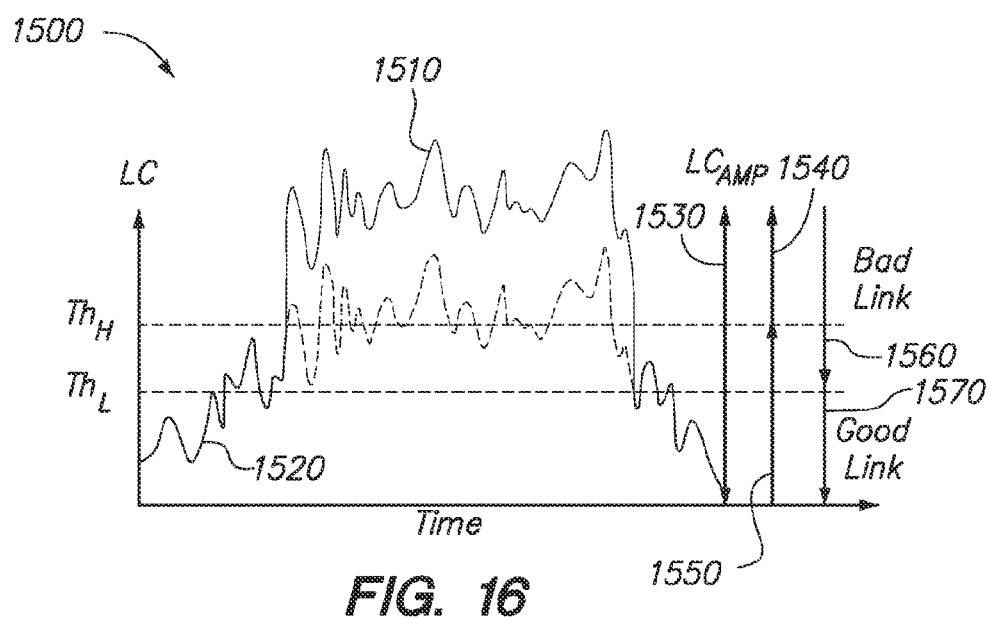

FIGS. 15 and 16 show graphs illustrating the time-varying LC variations of a network link. The link cost (LC) value noted for each link is a metric provided by Babel. On a regular interval (that is adjustable, say every 0.5 sec, 1 sec, etc.) a node transmits a "hello" message and keeps track of the received "I Heard You" ("IHU") message from any neighboring node within range. If the node receives an IHU message for every hello message then that link is as good as it gets and therefore has a minimum LC associated to it (The LC never reaches zero due to the calculation scheme used by Babel). If the node begins to receive fewer and fewer IHU messages from a specific neighboring node, then the LC for this specific link begins to increase. Babel adds the LC metric along a path to provide a measure of the quality of that route.

The sum of all the LC values along a routing path is called the Routing Path LC (RPLC). Intuitively, the lower the RPLC the better is the quality of that route. Consider the two routes in FIG. 7. The RPLC for path ABCE is 8 and the RPLC for path ADE is 5. Therefore, ADE must be the better route; however, this is not always the case. Roughly speaking, a link with a higher LC has a lower DR capacity. A minimum DR is required to sustain useable video that is provided by the RCV. Link DE provides a DR of only 1 Mbps, which is not nearly high enough for useable video transmission for the robotic system as shown in FIG. 1.

Accordingly, modifications have been made to improve route selection and reliability. A first modification was to discourage Babel from using a poor path, even though its RPLC is low. This modification involved applying an amplification function to the LC value for each link. This amplification function may be in the form of an addition, multiplication, or some other form of amplification. The purpose is to amplify the LC value by such a degree that the RPLC becomes very high, discouraging Babel from choosing that route.

The LC above which a required data rate cannot be sustained is determined experimentally. This LC value sets the maximum LC ($LC_{MAX}$) threshold. For example, suppose the LC value of 3 is determined to be $LC_{MAX}$ and suppose the amplification function is defined as f(LC)=LC+10. Since the LC of link DE is 4 and is above $LC_{MAX}$ we add 10 and get a RPLC=15 instead of 5 for path ADE, forcing Babel to choose path ABCE. FIG. 15 shows a time varying LC value of a link between two nodes. When the LC values moves above the $LC_{MAX}$ threshold it is amplified (in this case the amplification function adds a high value to the LC value). The amplified line in FIG. 15 is shown by reference number 1410, while the amplified line in FIG. 16 is shown by reference number 1510. The dotted black line, reference number 1420 in FIG. 8A and reference number 1520 in FIG. 16, shows the underlying non-amplified LC value. The amplified value is what is fed to Babel for route selection.

A second modification involves updating the LC value at the same rate as the hello packet rate. If the LC value changes smoothly over time then a single threshold (i.e. threshold set to $LC_{MAX}$) is OK. However, if the LC value varies rapidly (a more likely situation) then a single threshold will be problematic as it will cause the RPLC to bounce between a high value (when above threshold) and a low value (when below threshold). This is evident when looking at the graph in FIG. 15. This causes Babel to see a link that keeps switching between good and bad states at a rapid rate, which causes Babel to attempt to converge to the better routing path at the same rate. This in turn will cause delays that introduce difficulties when controlling an RCV. To alleviate the switching problem an additional threshold level is placed at a lower value than $LC_{MAX}$. This two-threshold approach introduces hysteresis that helps address the rapid switching problem.

FIG. 16 shows the benefit of adding hysteresis. A lower threshold level set too far below $LC_{MAX}$ places a heavy constraint on the link, in that it must be a very good link before the routing path to which it belongs is considered for use. This heavy constraint is not needed for the systems described herein given the nature of the data. On the other hand, a lower threshold level set too close to $LC_{MAX}$ can cause a time varying LC signal to cross both thresholds far too often, resulting in rapid switching of RPLC, defeating the purpose of the hysteresis.

A third modification involved setting the gap such that it is greater than the LC variance. The variance can be determined ahead of time based on experimental results and the thresholds set accordingly. However, a fixed value may not provide the required hysteresis because the variance of LC can change depending upon the operating environment. To account for this, the gap may be calculated online and adjusted if necessary. This can be done by using past M-samples of the LC to calculate the variance and update the variance with each new sample of LC, which is obtained at the same rate as the hello packet transmission rate. Note that the variance must be calculated using the underlying LC values and not the amplified LC values (although this depends on the amplification function used, it is safer to just use the underlying LC values). The gap can be checked against the updated LC variance to ensure it is greater than the variance.

FIGS. 15 and 16 show graphs involving the LC of a single communication relay node. Suppose two nodes (call them N1 and N2) are in close proximity to one another and suppose the converged routing path can only include one of the two nodes. The time varying nature of the LC values can cause Babel to keep switching the routing path between these two nodes. For example, suppose the LC of N1 (LCN1) is less than LCN2, or LCN1<LCN2. In this case the routing path will include N1. But in a very short period of time the opposite occurs, LCN1>LCN2. In this case Babel will switch the routing path to include N2. This can take place rapidly causing Babel to rapidly switch routing paths to include either N1 or N2. This rapid switching can happen even with hysteresis and amplification factored in so long as the two nodes are in close proximity to one another.

An example of close proximity is the robot carrying a communication relay in each mechanism (see FIG. 13C). To alleviate this issue, a binary link classification is used. In this case links are classified as either "good" or "bad". When a link (or node) is classified as being "good" we do not allow Babel to switch the routing path to another node in close proximity that may very well have a good LC. This way Babel is forced to stay with the first "good" link until it becomes "bad". So, for example, when the robotic system is carrying a communication relay in each mechanism, both nodes are very likely "good" links. Without this binary classification, the routing path can switch between the two communication relay nodes, causing issues. With binary classification the first communication relay node that is deemed "good" is the node the routing path goes through even if there is another "good" node nearby. For "bad" links we prioritize how "bad" they are so that when a "good" communication relay node turns "bad," we choose the best "bad" node.

FIG. 15 shows a plot 1400 of a time-varying LC value for a single link without hysteresis, while FIG. 16 shows a plot 1500 with hysteresis. Lines 1410 and 1510 represent the amplified value fed to Babel for route selection, with arrows 1430 and 1530 representing the LC amplification value. Lines 1420 and 1520 (which include the dotted lines) are the underlying LC value. Referring to FIG. 15, values above $LC_{MAX}$, represented by arrow 1440, are bad links, while values below it, represented by arrow 1450, are good links. Without hysteresis rapid switching takes place between good and bad link-determination.

Referring to FIG. 16, an increasing LC value remains a good link, represented by arrow 1550, until it passes the upper threshold ($Th_H = LC_{MAX}$), at which time it is considered a bad link, represented by arrow 1540. On the other hand, a decreasing LC value is considered a bad link, represented by the arrow 1560, until it passes below the lower threshold and is considered a good link, represented by the arrow 1570. It should be noted that the threshold levels are set far enough apart to prevent the LC signal from crossing both threshold levels during any of the local variations.

Besides the networking software, there is software used to setup and monitor the relay system. Currently, the system sends all routes, LC, Received Signal Strength Indicator (RSSI) and other various network metrics to a single node (usually the OCU) for processing. This information can be used to monitor the network connectivity and the quality of the links between nodes. For example, this information can be used to generate a graphical user interface showing the various connections between all radios in the network and the connection quality. This could also be sent out and propagated using the mesh software.

FIG. 17 shows a flowchart of an embodiment of a method 1600 in accordance with the System and Method for Remotely-Operated Deployment and Retrieval of Communication Relays. For illustrative purposes, method 1600 will be discussed with reference to system 1200 as shown in FIGS. 13A-13C. However, it should be recognized that method 1600 may be practiced by the other systems as described herein.

Method 1600 may begin at step 1610, which involves using a first lift mechanism 1240 coupled to a remotely-operated ground vehicle 1210 to engage a first communication relay 1260 and position first communication relay 1260 at a first angle above a ground surface (as shown in FIG. 13B). The first angle may be any angle greater than zero, so long as first communication relay 1260 does not contact the ground surface. As an example, the first angle may be 15 degrees. In some embodiments, the first angle may be determined by the angle by which first lift mechanism 1240 is offset with respect to second lift mechanism 1250. For example, if second lift mechanism 1250 was secured to flipper 1230 at a zero degree angle with respect to flipper 1230, and first lift mechanism 1240 was secured to flipper 1220 at a 15 degree angle with respect to flipper 1220, then the first angle would be 15 degrees.

Step 1620 may then involve using a second lift mechanism 1250 coupled to remotely-operated ground vehicle 1210 to engage a second communication relay 1270. Vehicle 1210 may engage second lift mechanism 1250 as described above. Next, method 1600 may involve positioning second communication relay 1270 at a second angle above the ground surface and first communication relay 1260 at a third angle above the ground surface. In embodiments where flippers 1220 and 1230 both rotate in unison, rather than independently, the positioning of the relays may occur with a single motion. In other embodiments, if a vehicle 1210 is used that does not require unison movement of flippers, separate motions may occur for the communication relays to be positioned at the appropriate angles.

For step 1630, the third angle is greater than or equal to both the first angle and the second angle. Further, the second angle is greater than or equal to the first angle. As noted above, of the flippers of robotic system 1210 rotate in unison, the different angles result from the difference in the angles by which mechanisms 1240 and 1250 are secured to flippers 1220 and 1240, respectively. For example, if mechanism 1240 is secured to flipper 1220 at an angle of 15 degrees higher than parallel, and mechanism 1250 is secured to flipper 1230 parallel to flipper 1230, and both flippers 1220 and 1240 are rotated upward 20 degrees, then the first angle is 15 degrees, the second angle is 20 degrees, and the third angle is 35 degrees.

Method 1600 may then proceed to step 1640, which involves deploying second communication relay 1270 at a first location by simultaneously lowering first communication relay 1260 and second communication relay 1270 until second communication relay 1270 contacts the ground surface and disengages from the remotely-operated ground vehicle. Second communication relay 1270 will contact the ground surface before first communication relay 1260 because first lift mechanism 1240 is positioned at a higher angle than second lift mechanism 1250. Further, as discussed above, downward rotation of flipper 1230 will need to occur beyond the rotation involved for second communication relay 1270 to contact the ground surface. Such rotation is required to overcome the magnetic attraction between the magnets embedded within the disk catch of second communication relay 1270 and the magnetic embedded within second lift mechanism 1250.

Method 1600 may then proceed to step 1650, which involves moving the remotely-operated ground vehicle to a second location. The second location may be any location with respect to the first location such that the communication signal is still being received by robotic system 1210 from second communication relay 1270, which has been deployed at the first location. Next step 1660 involves deploying first communication relay 1260 at the second location by further lowering first communication relay 1260 until it contacts the ground surface and disengages from the remotely-operated ground vehicle, similar to the deployment of second communication relay 1270.

After deployment, each of both first communication relay 1260 and second communication relay 1270 may be retrieved by robotic system 1210 in the same manner by which the relays were originally loaded onto robotic system 1210 It is also possible that after second communication relay 1270 is deployed at a location and before first communication relay 1260 is deployed, the user may use second lift mechanism 1250 to reload second communication relay 1270 at its current position and move it to a different, more suitable location for deployment.

Many modifications and variations of the System and Method for Remotely-Operated Deployment and Retrieval of Communication Relays are possible in light of the above description. Within the scope of the appended claims, the embodiments of the method and system described herein may be practiced otherwise than as specifically described. The scope of the claims is not limited to the implementations and the embodiments disclosed herein, but extends to other implementations and embodiments as contemplated by a person having ordinary skill in the art.

We claim:

1. A system comprising:
a remotely-operated ground vehicle having a first lift member and a second lift member;
a first lift mechanism coupled to the first lift member; and
a second lift mechanism coupled to the second lift member, wherein the first lift mechanism and the second lift mechanism are positioned at different angles with respect to a ground surface;
wherein the first lift mechanism and the second lift mechanism each comprise a body portion having a first prong and a second prong separated by an opening;
wherein, for each of the first lift mechanism and the second lift mechanism, the portion of the body portion near the intersection of the first prong and the second prong includes a plurality of magnets embedded therein;
wherein the system further comprises a communication relay secured to at least one of the first lift mechanism and the second lift mechanism,
wherein the communication relay comprises a housing, a mechanism catch extending from a side of the housing, a disk coupled to the mechanism catch at a distance from the side of the housing, the disk having a plurality of magnets embedded therein surrounding the mechanism catch, and an antenna mast coupled to the disk, wherein the mechanism catch is disposed within the opening separating the first prong and the second prong and the plurality of magnets embedded within the disk are magnetically coupled to the plurality of magnets embedded within the portion of the body portion near the intersection of the first prong and the second prong.

2. The system of claim 1, wherein the communication relay further comprises an antenna coupled to the antenna mast and electronics, contained within the housing, configured to process input signals received via the antenna and generate output signals for transmission via the antenna.

3. The system of claim 1, wherein the communication relay further comprises a battery contained within the housing and a power button, located on the housing, having a built-in light emitting diode for indicating system functionality.

4. The system of claim 3, wherein the first lift mechanism, the second lift mechanism, and the mechanism catch are made of a non-ferrous material.

5. The system of claim 3, wherein the first lift mechanism, the second lift mechanism, and the mechanism catch are made out of hard plastic.

6. The system of claim 3, wherein the first lift mechanism, the second lift mechanism, and the mechanism catch are made out of sheet metal.

7. The system of claim 1, wherein the first lift mechanism and the second lift mechanism each further comprise a lift member attachment portion having multiple attachments secured thereto, wherein the attachments secure the respective first and second lift mechanism to the respective first and second lift member.

8. The system of claim 7, wherein at least two of the multiple attachments are secured to the lift member attachment portion offset from each other such that when the respective lift mechanism is secured to the respective lift member, the respective lift mechanism is secured at a different angle than its respective lift member.

9. The system of claim 1, further comprising a communication relay secured to at least one of the first lift mechanism and the second lift mechanism.

10. The system of claim 1, wherein the first lift member and the second lift member are positioned at opposite sides of a front end of the remotely-operated ground vehicle.

11. The system of claim 1, wherein the first lift member and the second lift member are both controlled by a single motor contained within the remotely-operated ground vehicle.

* * * * *